April 23, 1935.  E. C. DEAL  1,999,016
MECHANICAL ADJUSTER
Filed Dec. 22, 1934
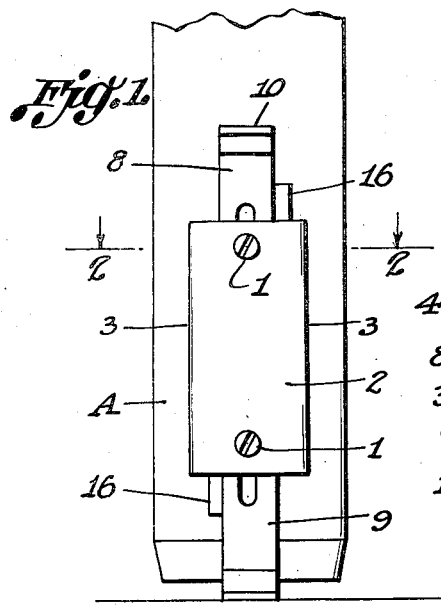
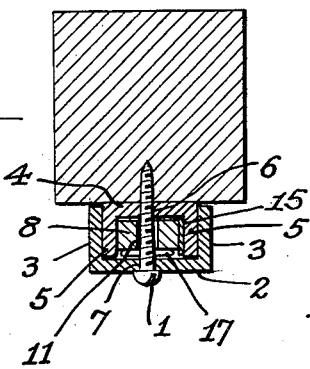
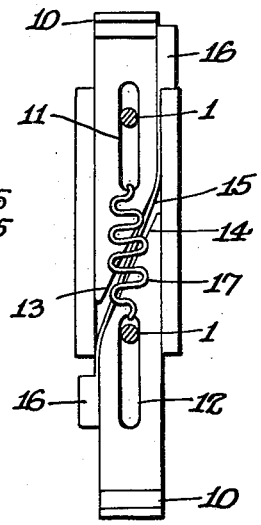
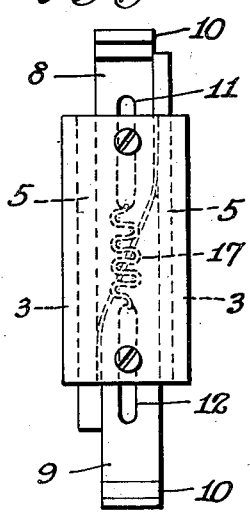
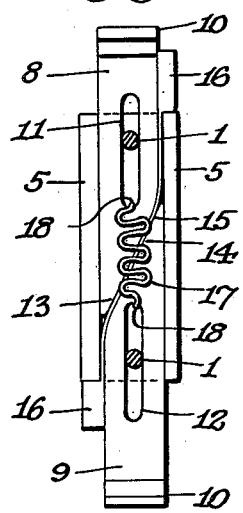
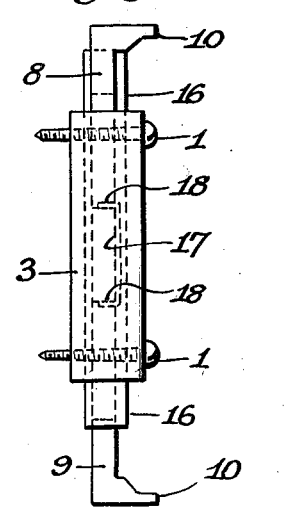
Inventor
E. C. Deal
By Lester L. Sargent
Attorney Patented Apr. 23, 1935

1,999,016

UNITED STATES PATENT OFFICE 1,999,016

MECHANICAL ADJUSTER

Erastus C. Deal, Wilkes-Barre, Pa.

REISSUED

Application December 22, 1934, Serial No. 758,846

5 Claims. (Cl. 45—139)

The object of my invention is to provide a mechanical adjuster intended for universal application where a mechanical device is required for supporting or holding articles in various adjusted and fixed positions, such as leveling tables when on an uneven floor; taking the place of the rack and rack support on a lifting jack; supporting the weight of an automobile when the wheel is lifted from the ground; as a door stop for holding a door ajar at any desired position, and for other purposes. I attain the objects of my invention by the mechanism illustrated in the accompanying drawing, in which—

Figure 1 is a front plan view of my invention applied to a leg of a table;

Fig. 2 is a horizontal section on line 2—2 of Fig. 1;

Fig. 3 is a front plan view of the invention with the cover plate 2 removed and with the device in the position it assumes during the step of adjusting it to a different position, with the wedge members 8 and 9 drawn apart as far as the spring 17 will permit;

Fig. 4 is a front plan view of the invention in an adjusted position with part of the device which are concealed by cover 2 indicated in dotted lines;

Fig. 5 is a similar view of the invention with the cover plate 2 removed; and

Fig. 6 is a side elevation of the device.

Like numerals designate like parts in each of the several views.

Referring to the accompanying drawing, I provide a holder consisting of a base 4 and a cover 2, the sides 3 of the cover 2 engaging over the sides 5 of the base 4, as shown in Fig. 2. These members are secured to an element to be adjusted, such as a table leg A as shown in Fig. 1, by means of screws 1 which pierce the cover 2 as at 7 and the base 4 as at 6, as shown in Fig. 2. I provide an upper wedge 8 and a lower wedge 9 each having a similar foot 10 at their respective outer ends. Wedge 8 has a slot 11 and wedge 9 a similar slot 12 through which the screws 1 are inserted to permit free sliding movement of the wedges relative to the screws 1 holding the casing elements to each other and to a member to be adjusted, such as the table leg A shown in Fig. 1. Extending between the inclined face or wedge surface 13 of wedge 8 and the imposed inclined face or wedge surface 14 of wedge 9, is a thin flexible metal strip 15 which I have devised and which has outturned projections 16 at its ends to engage over the ends of the respective sides 5 of the base 4, as shown in Figs. 3, 4, and 5, as the casing members 4 and 2 are open at the ends as shown in the drawing.

I provide a suitable fluted spiral or other spring 17 having bent-in ends 18 attached to the respective wedges 8 and 9 as shown in Figs. 5 and 6 to retain same in proximity to each other while permitting them to be retracted slightly from each other.

The strip of metal 15 separates the wedges 8 and 9 and tends to convey the strain or load to the body or case of the device, thereby preventing one wedge from being forced out of position by the other wedge and facilitating close or fine adjustment. Adjustment is accomplished by raising wedge 8 or lowering wedge 9, the other wedge being caused to follow by the connection made between the wedges by spring 17 but as one wedge is raised or the other wedge lowered, the engagement with the thin metal strip 15 is released so that both wedges will slide longitudinally in the casing and the strip of metal will change its shape or conformation accordingly, as will be apparent by reference to Fig. 3, as it is quite flexible. When pressure is again exerted in the wedges a strip of metal causes them to wedge against the casing and lock in position thereby completing the adjustment and making it fixed as long as desired. As an illustration, if the body or case is attached to a table leg, as shown in Fig. 4, and it is desired to level the table in order to compensate for a low place in the floor, the adjustment would be accomplished by pressing down on wedge 9 until the proper adjustment or leveling is reached, then by a slight pressure on top of wedge 8 it will fasten or lock wedge 9 in the desired permanent position. It will be noted that the spring 17 causes the locking wedge to follow the supporting wedge when the latter is moved from one position to the other to get proper adjustment.

When using this device for holding a door ajar, the adjustment is accomplished in a similar manner. The device may be made of any suitable material and in various sizes to comply with the requirements for which the article may be used.

What I claim is:—

1. In a mechanical adjuster of the type described, the combination of a casing open at the ends, like wedges mounted in the casing and having opposed wedge surfaces, a flexible thin strip of metal extending between the wedge surfaces of the aforesaid wedges and having projections at each end extending beyond and adapted to engage the outer edges of the casing, and a spring operatively connecting the two wedges and permitting them to draw apart from each other slightly when one of the wedges is moved.

2. In a mechanical adjuster of the type described, the combination of a casing open at the ends, wedges mounted in the casing and having opposed wedge surfaces, a flexible thin strip of metal extending between the wedge surfaces of the aforesaid wedges and having projections at each end extending beyond and adapted to engage the outer edges of the casing, and a spring operatively connecting the two wedges and permitting them to draw apart from each other slightly when one of the wedges is moved.

3. In a mechanical adjuster of the type described, the combination of a casing open at the ends, like wedges mounted in the casing and having opposed wedge surfaces, a flexible thin strip of metal extending between the wedge surfaces of the aforesaid wedges and extending beyond the casing, and a spring operatively connecting the two wedges and permitting them to draw apart from each other slightly when one of the wedges is moved.

4. In a mechanical adjuster of the type described, the combination of a casing open at the ends, like wedges mounted in the casing and having opposed wedge surfaces, a flexible thin strip of metal extending between the wedge surfaces of the aforesaid wedges and having projections at each end extending beyond and adapted to engage the outer edges of the casing, and a spring operatively connecting the two wedges and permitting them to draw apart from each other slightly when one of the wedges is moved, the aforesaid wedges having longitudinal slots fastening means extending through the casing and through said slots for fastening the casing to an article to be adjusted while permitting free slidable movement of the wedges in the casing.

5. In a mechanical adjuster of the type described, the combination of a casing open at the ends, like wedges mounted in the casing and having opposed wedge surfaces, said wedges having feet at their outer ends, a flexible thin strip of metal extending between the wedge surfaces of the aforesaid wedges and having projections at each end extending beyond and adapted to engage the outer edges of the casing, and a spring operatively connecting the two wedges and permitting them to draw apart from each other slightly when one of the wedges is moved.

ERASTUS C. DEAL.